United States Patent [19]

Bianco, Jr.

[11] Patent Number: 4,463,494

[45] Date of Patent: Aug. 7, 1984

[54] APPARATUS FOR SHAPING PRECIOUS METALS

[76] Inventor: Anthony F. Bianco, Jr., 1101 Morris St., Philadelphia, Pa. 19148

[21] Appl. No.: 347,438

[22] Filed: Feb. 10, 1982

[51] Int. Cl.³ .......................... B23D 9/00; B26B 27/00
[52] U.S. Cl. .................................... 30/90.4; 30/92.5
[58] Field of Search ............... 30/90.8, 90.4, 90.6, 30/90.7, 92.5; 409/304; 83/875

[56] References Cited

U.S. PATENT DOCUMENTS

| 431,564 | 7/1890 | Denison | 30/92.5 |
|---|---|---|---|
| 2,247,840 | 7/1941 | Harrison | 30/294 |
| 2,477,678 | 8/1949 | Woolman | 81/9.51 |
| 2,520,254 | 8/1950 | Partain | 409/304 X |
| 2,624,221 | 1/1953 | Schneider | 81/9.51 |
| 2,675,580 | 4/1954 | Pesce | 17/25 |
| 2,761,211 | 9/1956 | Grant | 30/91 |
| 3,093,023 | 6/1963 | Vail | 30/92.5 |
| 3,114,277 | 12/1963 | Clendenin | 30/90.4 X |
| 3,375,579 | 4/1968 | Slonksnes | 30/90.8 |
| 3,988,826 | 11/1976 | Heikkala | 30/90.4 |

FOREIGN PATENT DOCUMENTS

| 555009 | 7/1943 | United Kingdom | 30/90.7 |
|---|---|---|---|
| 792605 | 4/1958 | United Kingdom | 30/90.7 |

Primary Examiner—Jimmy C. Peters
Attorney, Agent, or Firm—Benasutti and Murray

[57] ABSTRACT

An apparatus in a form of a tool are disclosed to preform bezel wire, which is used for gem stone settings or the like. The tool utilized herein is comprised of a metal block through which is formed an opening for drawing a soft metal wire against a cutting tool positioned orthogonally to the opening. The opening is characterized by larger openings at entrance and exit locations of the opening for ease in fabricating the groove. Collar means are also provided to adapt the opening to different gauge wires.

9 Claims, 6 Drawing Figures

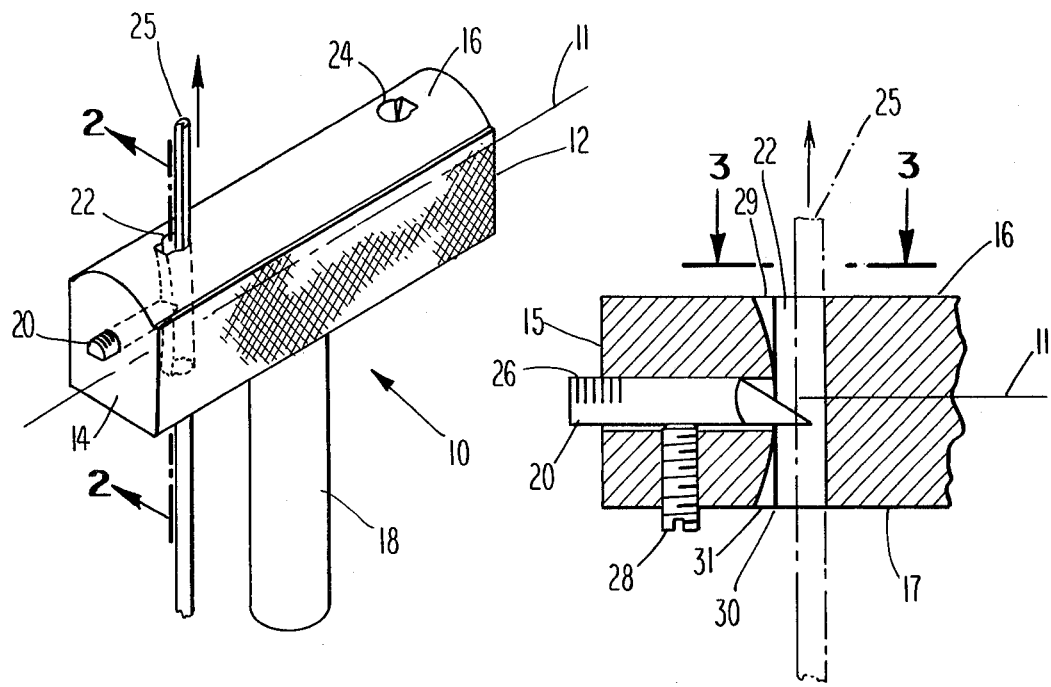
*Fig. 1*
*Fig. 2*
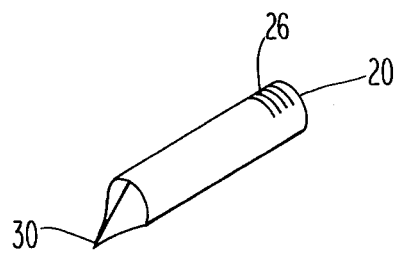
*Fig. 4*
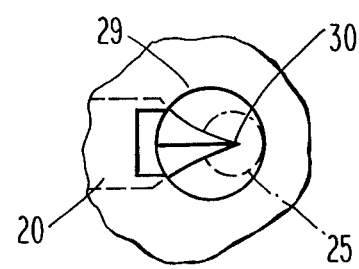
*Fig. 3*
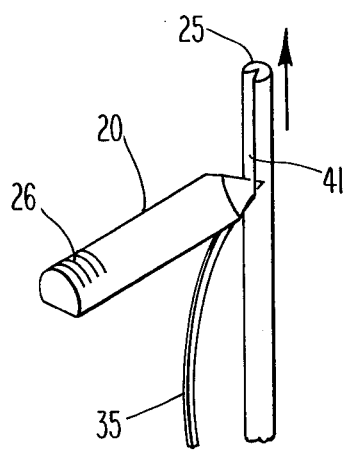
*Fig. 5*
*Fig. 6*

APPARATUS FOR SHAPING PRECIOUS METALS

BACKGROUND OF THE INVENTION

1. Field of the Disclosure

The invention pertains to metal tool cutting devices, and in particular pertains to tool cutting devices for use with precious metals. 2. Description of the Prior Art In known prior art arrangements for setting gem stones in rings, or the like, a jeweler conventially positions a precious metal wire in a holding device such as a vise, and then manually proceeds to cut a track or groove therein by means of a drill tool bit. The grooved precious metal wire or bezel is located thereafter around the gem stone and soldered into place upon the ring so that the stone will be firmly held in place. The bezel in combination with the gem stone or diamond, as the case may be, enhances the appearance of the ring as well as being functional.

The method and apparatus utilized to fabricate the bezel above described is characterized by numerous shortcomings among which are development of tedium in cutting the groove with a hand drill, difficulty in maintaining a straight track in the wire by manual operation, developing a high ratio of waste with respect to good bezels produced, and difficulty in achieving high production rates.

Various patents are cited herein which are utilized in various cutting arts but none teach how to employ a cutting tool with a metallic workpiece for shaping small gauge precious metals. These patents are listed as follows: U.S. Pat. No. 2,247,840; U.S. Pat. No. 2,477,678; U.S. Pat. Nos. 2,624,221; 2,675,580; 2,761,211; 3,988,826.

SUMMARY OF THE INVENTION

A tool has been disclosed for cutting a track in a soft metal wire by pulling the wire through a bore against which is placed a cutting tool oriented orthogonally to the travel direction of the wire. The bore of the cutting tool is provided with a viewer which enables the artisan or jeweler to view at close hand the operational relationship between the tip of the cutting tool with respect to the wire being drawn through the bore. The bore is also provided at the opposite end of viewer with an enlarged opening that enables cuttings from the grooved wire to be readily expelled through the tool.

The tool of this invention is also characterized in its ability to determine depth by which the wire is grooved in two different ways, one of which is by use of gradations on the periphery of the cutting bit as it is inserted into the tool, and secondly, by making fine adjustments to create a groove of desired depth by sighting through the viewer.

The present invention also provides a unique arrangement such that various sized wires can be accommodated by the tool of this invention by insertion of a proper sized collar within the bore. The collars are readily inserted and removed within the bore for use as needed.

Accordingly, it is an object of the invention to provide a new and useful cutting tool for use in the precious metal arts.

It is another object of the present invention to provide a new and useful cutting tool that can readily accommodate itself to different sized wires.

It is yet another object of the present invention to provide a tool that will readily produce a wire bezel for the jewelery trade.

BRIEF DESCRIPTION OF THE DRAWINGS

FIG. 1 is a perspective view of a cutting mechanism for precious metals in accordance with this invention.

FIG. 2 is a view of FIG. 1 taken through section 2—2.

FIG. 3 is a view of FIG. 2 taken through section 3—3.

FIG. 4 is a perspective view of a cutting tool utilized with the cutting mechanism of FIG. 1.

FIG. 5 is a top view depicting a formation of a cutting track in a precious metal wire as disclosed herein.

FIG. 6 is a fragmentary three-quarter sectional view illustrating a collar insert adapted to fit within the opening of the cutting mechanism shown in FIG. 1.

DESCRIPTION OF THE PREFERRED EMBODIMENT

Referring now in particular to FIG. 1, a precious metal wire cutting device 10 of this invention is shown comprised of an elongated body member 12 having a center-line 11 extending in an axial direction through said member. The center-line 11 also extends through vertical bores 22, 24, which are formed perpendicular thereto. The bores 22, 24 are formed so that their respective entrance and exit openings have larger cross-sectional areas than exist at the interior along center-line 11. By way of example, an entrance and exit openings 29, 31 are shown in FIG. 2 as being larger in cross-sectional area than the cross-sectional area along center-line 11. The reasons for these larger cross-sectional areas at the entrance and exit openings 29, 31 will be discussed in a later paragraph. A cutting tool 20 is positioned orthogonally to the bore 22. For purposes of simplicity, only a single cutting tool will be shown and discussed since the principles involved with bore 22 apply equally to bore 24. The cutting tool 20 having cutting edge 30 (FIGS. 2, 3, 4) is adapted to be inserted a required distance for cutting into a precious metal wire 25 such as gold, silver or other soft metal. The distance at which the cutting edge 30 is inserted into the bore 22, for example, can be determined by gradations 26 (FIGS. 2, 4) formed on the surface of the tool 20. Once the cutting tool 20 is inserted into the bore 22 against a wire element 25 a desired distance by an artisan, it is fixedly positioned therein by a set screw 28 (FIG. 2).

Referring to the sectional view 2—2 of FIG. 1 as depicted in FIG. 2 the wider upper opening 29 is utilized as a view finder for the artisan so that he can sight within the bore 22 during an operational phase of the invention. During the operational phase of the invention, a groove or track 41 (FIG. 5) is to be formed in the soft wire 25. This aspect of the invention is significant in view of the relatively small gauge of precious metal wire that is employed for making bezels that are utilized in setting precious gems in rings, for example. In other words, the artisan by means of the view finder 29 is able to readily view the cutting edge 30 of the cutting tool 20 against the small gauge, precious metal wire 25 as the latter is being gently pulled upwardly to form track 41 (FIG. 5). This is important to the artisan so that he can observe whether the cutting process is proceeding properly, or perhaps is going awry because of damage to the cutting tool 25 or defect of the wire. In such an eventuality, the artisan is able to terminate the operation quickly in order to avoid additional damage to the wire 25 or cutting tool 20. The view finder 29 is also used in the operational phase to determine a precise depth that the cutting edge 30 is to be set, and which cannot be adequately accomplished by means of the exterior gradations 26 of the cutting tool 20.

Referring now to the bottom portion of the section 2—2 of FIG. 2, an exit opening 30 is depicted wherein it can be readily appreciated that this opening is similar in cross-sectional area to that of the entrance opening 29. The purpose of enlarged exit 30 is to allow the track shaving 35 (FIG. 5) sufficient room to exit the bore 22 as it is being generated by cutting tool 20 as wire 25 is being drawn in an upward direction by the artisan. It should be understood by those skilled in the art that in the preferred embodiment the cross-sectional areas of the entrance and exit opening 29, 31 are identical, however, these areas may be altered to satisfy a user without departing from the spirit of this invention.

Briefly referring now to FIG. 3 which is a sectional top view 3—3 through FIG. 2, it can be seen how the enlarged entrance opening 29 acts of a view-finder for the artisan so that the cutting edge 30 in relation to the precious metal wire 25 may be readily observed during the operational phase of the invention.

As briefly alluded to above with respect to the operational stage of the invention, the wire 25 is drawn upwardly against the cutting tool 20 to produce a track 41 (FIG. 5). During this aspect of the invention, the workpiece 25 is positioned against a wall of the bore 22 opposite that from which the cutting tool 20 emerges. The positioning of the wire 25 against the wall of the bore with respect to the cutting tool 20 provides a firm support such that the artisan can readily pull the workpiece 25 in on upward direction. In other words, by positioning the wire 25 against the bore side by means of the cutting tool 20, the workpiece is effectively positioning while the cutting operation is proceeding. Additionally the artisan can hold top and bottom of the workpiece 25 in the respective fingers of either hand to provide stability as it is being pulled upwardly, such that a straight track 41 (FIG. 5) is provided.

The three-quarter sectional view of FIG. 6 illustrates a feature of the present invention wherein the disclosed embodiment can be readily adapted to receive smaller gauge wire than provided for by the bores 22 and 24. This is achieved by inserting within the bore 22 a partially cylindrical collar 37 having an open portion which is oriented to face an orthogonal bore 50. As is understood, orthogonal bore 50 is arranged to receive the cutting tool 20 (FIGS. 1, 2). Thus, those skilled in the art can readily appreciate that the bores 22, 24 can be fabricated to receive the largest gauge precious metal wire, and by inserting a proper collar 37, the cuttng mechanism 10 (FIG. 1) can be readily adapted to receive wires of different smaller gauges. It should be understood by those skilled in the art that although the preferred embodiment has been described with respect to round wires of different gauges, wires of different cross-section such as square, oval, or triangular can readily be used in accordance with the principles taught by this invention.

Conventially, the tool 10 can be held in a vise while the jeweler or artisan performs the operational steps of the present invention. The present invention is also adapted so that the cutting device 10 can be hand-held by means of the handle 18 (FIG. 1). It can therefore be appreciated how simply and expeditiously the T-shaped cutting device 10 of this invention can be readied by the artisan to begin the cutting phase of this invention either by fixing the tool so that it is immoveable, or using the invention in a portable mode.

It will be understood that the foregoing suggested apparatus as exemplified by the Figures, is intended to be illustrative of a preferred embodiment of the subject invention and that many options will readily occur to those skilled in the art without departure from the spirit or the scope of the principals of the subject invention.

What I claim is:

1. An apparatus for forming a groove in a length of jewelry metal, said apparatus comprising:
   a. an elongated body having at least upper, lower and end surfaces;
   b. at least one vertical first opening through said body between said upper and lower surfaces and perpendicular to an axis extending through said body along its largest dimension;
   c. said first opening having a larger cross-sectional opening at said upper surface than at a location whereat said axis extends through said body;
   d. a second opening extending into said body and substantially perpendicular to said first opening;
   e. a metal grooving tool positioned in said body such that it is secured within and extending through said second opening wherein the groove cutting portion of said tool extends into said first opening a desired distance to intersect the movement of jewelry metal through said first opening and for removing a track of jewelry metal and forming a desired depth groove in said length of jewelry metal as it progresses through said vertical first opening.

2. An apparatus in accordance with claim 1 wherein the opening at lower surface has a cross-sectional opening approximately equal to the cross-sectional opening at said upper surface.

3. An apparatus in accordance with claim 1 wherein means are located on said cutting tool for measuring a distance that said cutting tool enters said vertical opening.

4. An apparatus in accordance with claim 1 wherein removable collar means are adapted to fit within said vertical opening to readily reduce its diameter to fit a desired wire gauge.

5. In an apparatus in accordance with claim 1 wherein holding means are perpendicularly positioned with respect to the lower surface of said elongated body.

6. In an apparatus in accordance with claim 1 wherein a second, vertical circular opening is provided through said upper and lower surfaces which is perpendicular to said axis extending through said body in an axial direction,
the cross-sectional openings at said upper surface and at said axis extending through said body in an axial direction being different from said first mentioned cross-sectional openings.

7. An apparatus for forming a groove in a metallic article, said apparatus comprising:
   a body portion having upper, lower and end surfaces;
   a vertical opening extending between said upper and lower surfaces, said vertical opening having a larger diameter at the upper end thereof than at the middle portion thereof;
   a second opening perpendicular to and in communication with said vertical opening; and a metal grooving tool positioned in said body portion within said opening and extending into said vertical opening wherein the grooving tool extends a desired distance to intersect the movement of metal through said vertical opening and for continuously removing a portion of metal and forming a continous groove in said metallic article.

8. The apparatus of claim 7 wherein said apparatus further comprises means for fixedly positioning said tool within said second opening.

9. The apparatus of claim 7 wherein said apparatus further comprises:
an insertion means receivable wherein said vertical opening and dimensioned to reduce the gauge of said vertical opening.

* * * * *